United States Patent
Zey

(10) Patent No.: US 7,274,785 B2
(45) Date of Patent: *Sep. 25, 2007

(54) SYSTEM AND METHOD OF MANUFACTURE FOR ESTABLISHING LOCAL PAYPHONE CALLS THROUGH LONG DISTANCE CARRIER SWITCHES

(75) Inventor: David Zey, Faquay-Varina, NC (US)

(73) Assignee: MCI Communications Corporation, Washington, DC (US)

(*) Notice: Subject to any disclaimer, the term of this patent is extended or adjusted under 35 U.S.C. 154(b) by 667 days.

This patent is subject to a terminal disclaimer.

(21) Appl. No.: 10/651,994

(22) Filed: Sep. 2, 2003

(65) Prior Publication Data

US 2004/0042608 A1 Mar. 4, 2004

Related U.S. Application Data

(63) Continuation of application No. 09/136,248, filed on Aug. 19, 1998, now Pat. No. 6,718,029.

(51) Int. Cl.
*H04M 7/00* (2006.01)

(52) U.S. Cl. .......................... 379/221.02; 379/211.05; 379/221.14; 379/144.05

(58) Field of Classification Search ........... 379/207.02, 379/221.02, 207.11, 220.01, 221.14, 114.01, 379/88.16, 114.15, 114.17, 115.01, 115.02
See application file for complete search history.

(56) References Cited

U.S. PATENT DOCUMENTS

| | | |
|---|---|---|
| 4,565,903 A | 1/1986 | Riley |
| 5,550,910 A | 8/1996 | Dejager |
| 5,553,129 A | 9/1996 | Partridge, III |
| 5,559,857 A | 9/1996 | Dowens |
| 5,621,787 A | 4/1997 | McKoy et al. |
| 5,781,620 A | 7/1998 | Montgomery et al. |
| 5,828,740 A * | 10/1998 | Khuc et al. .............. 379/114.2 |
| 5,898,771 A | 4/1999 | Florindi et al. |
| 5,905,791 A | 5/1999 | Goel et al. |
| 6,154,533 A * | 11/2000 | Foelker .................. 379/201.01 |
| 6,195,422 B1 | 2/2001 | Jones et al. |
| 6,324,277 B1 | 11/2001 | Akinpelu et al. |
| 2002/0196918 A1 | 12/2002 | Culli et al. |

* cited by examiner

*Primary Examiner*—Fan Tsang
*Assistant Examiner*—Simon Sing

(57) ABSTRACT

A method and system for establishing a local call from a payphone by a customer through long distance carrier switches. The payphone customer dials a long distance provider primary intralata carrier (PIC) code followed by a number sequence. The local call is routed to a long distance provider switch using the long distance provider PIC code. The payphone call is then routed to a voice response unit (VRU) using the number sequence. The VRU prompts the payphone customer to select local calling from the VRU menu, enter a destination number, and to enter their long distance calling card information. The system then verifies that the customer's calling card account is active and connects the call.

11 Claims, 4 Drawing Sheets

SYSTEM AND METHOD OF MANUFACTURE FOR ESTABLISHING LOCAL PAYPHONE CALLS THROUGH LONG DISTANCE CARRIER SWITCHES

RELATED APPLICATIONS

The present application is a continuation of U.S. patent application Ser. No. 09/136,248 filed on Aug. 19, 1998 now U.S. Pat. No. 6,718,029 entitled "Method and Article of Manufacture for Establishing Local Payphone Calls Through Long Distance Carrier Switches", which is hereby incorporated by reference in its entirety.

BACKGROUND OF THE INVENTION

1. Field of the Invention

The present invention relates generally to telecommunications, and more particularly to a method for establishing cost effective local calls.

2. Related Art

Although competition has brought many advances and new telecommunications services, limited options are available to place a local call from a public payphone. Consumers have two ways of placing local calls using a payphone. The consumer may use the traditional method of paying the telephone company payphone charge by inserting money into the payphone. Alternatively, the consumer may dial a toll free number and use their calling card to bill the local call to their home account.

The traditional method for making a local call using a public payphone is the consumer inserts the charge for the call into the payphone. When placing local calls from a payphone by inserting the charge for the call directly into the phone, the consumer must have the exact change, i.e., 35 cents, charged by the payphone provider for placing the call. If the consumer dials the wrong number, the consumer may not receive credit for the call. If the call is of short duration, the consumer pays a high charge for a local call (often more expensive than a long distance call).

Alternatively, the consumer may dial a toll free number and use their calling card to bill the local call to their home account. A calling card is a card with a number that allows residential customers to place a long distance call from a phone other than their home phone and bill the call to their home account by providing the calling card number. When placing local calls from a payphone by using a calling card, the consumer must dial a toll free number. Upon a prompt, such as a chime, the consumer enters their 14 digit calling card number. Upon a second prompt such as a double beep, the consumer dials their destination number. The call is processed and billed by the long distance provider. Surcharges for using the calling card apply.

SUMMARY OF THE INVENTION

The present invention is a method and system for establishing local payphone calls through a long distance provider network without using a toll free number. In order to initiate a local call through a long distance provider network rather than dialing a toll free number to access the long distance carrier, the consumer enters a long distance provider primary intralata carrier (PIC) code followed by a number sequence. The call is routed to a long distance provider switch using the long distance provider PIC code.

The call is received by a long distance provider switch. The number sequence indicates that the call should be handled by a voice response unit (VRU). The long distance provider switch routes the call to the VRU which prompts the payphone customer to select a service from a menu The customer selects local calling by entering the appropriate response into the keypad of the telephone. The VRU then prompts the customer for a destination number and a calling card number.

The long distance provider switch receives the destination number and calling card number. The calling card number is verified by querying a data access point (DAP). If the calling card number is valid, the call is terminated to the destination number.

The system comprises a payphone which is used to initiate the call and a destination phone which receives the call. Both the payphone and the destination phone are connected to a telephone company central office switch which provides switching functionality to telephones, private branch exchanges (PBXs), and to other switches. The telephone company central office switch is connected to a telephone company tandem switch which tandems the call to the long distance provider switch. The long distance provider switch is connected to the VRU to provide the consumer with a menu interface for selecting local calling and the DAP to respond to queries to verify the calling card number.

Further features and advantages of the invention, as well as the structure and operation of various embodiments of the invention, are described in detail below with reference to the accompanying drawings.

BRIEF DESCRIPTION OF THE FIGURES

In the drawings, like reference numbers generally indicate identical, functionally similar, and/or structurally similar elements. The drawing in which an element first appears is indicated by the digit(s) to the left of the two rightmost digits in the corresponding reference number. The present invention will be described with reference to the accompanying drawings, wherein.

DETAILED DESCRIPTION OF THE PREFERRED EMBODIMENTS

1.0 Overview

Figure 1:
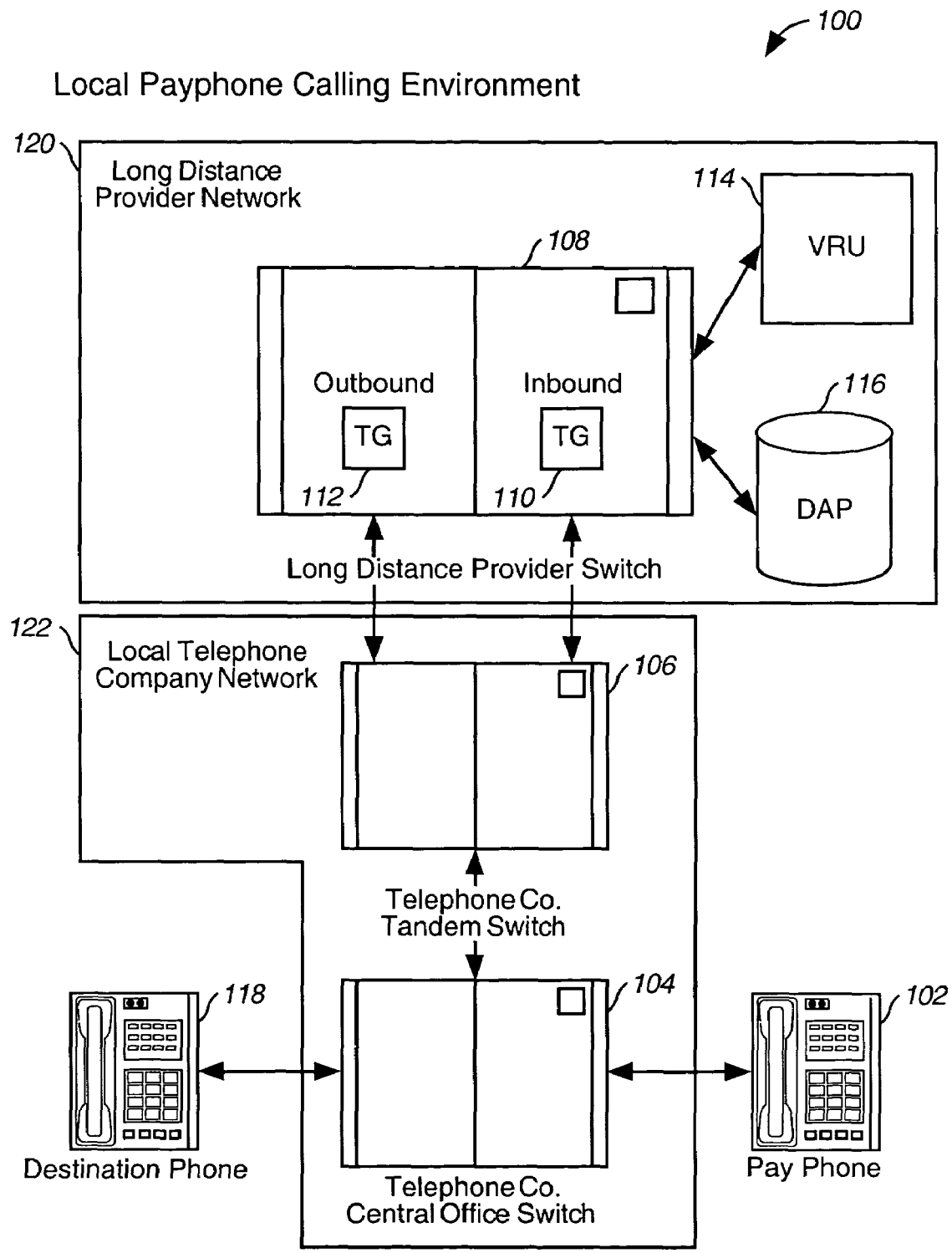
FIG. 1 illustrates a block diagram of a local payphone calling environment according to one embodiment of the present invention.

The present invention allows customers to establish local calls from a payphone by dialing a primary intralata carrier (PIC) code and a number sequence. The PIC code is not recognized as a telephone call but rather alerts the local telephone company that a customer wishes to place a local call using their long distance provider. The PIC code is received by a long distance provider switch and the long distance provider switch processes the call.

The number sequence following the PIC code indicates to the long distance provider switch that the call is to be processed by a voice response unit (VRU). The VRU prompts the customer for additional information. The VRU first prompts the caller for the customer's service selection. After the customer selects to place a local call, the VRU prompts the customer for a destination number (which is the telephone number of the called part) and a calling card number.

When the customer enters the needed information, the long distance provider switch 108 routes the call back to the local telephone company for termination to the destination number.

2.0 Terminology

Provided below is a brief description of the terminology used within this document. Additional description is provided in the following sections along with exemplary implementations and embodiments. However, the present invention is not limited to the exemplary implementations and embodiments provided.

A "telephone company payphone" is any equipment that can be used to initiate a call via a telecommunications network and accept a form of payment from the caller at the time the call is made. "Destination phone" is any equipment that can accept a call from a telecommunications network.

A "telephone company central office switch" is a switch, also referred to as an exchange, that is the local area switch that provides access and termination to telecommunications network customers. A telephone company central office switch would be the first switch to process an incoming call from a customer. A "telephone company tandem switch" is a switch that tandems a call between switches in a telecommunications network. A "long distance provider switch" is a switch in a long distance provider's telecommunications network.

A "voice response unit" is a unit that provides interactive voice response services within a telecommunications network. A voice response unit need not respond to a caller's voice but may accept dialed digit selections into a keypad or other method of entering a selection.

A "data access point" is a component within a telecommunications network that stores data. The data access point responds to queries sent by a switch using the stored data A "primary intralata carrier (PIC) code" is a code used by a local telephone company to identify a particular long distance provider. A long distance provider is a telecommunications service provider that provides long distance telecommunications services or could be made capable of providing long distance telecommunications services. A "number sequence" is a sequence of numbers that follow the PIC code and indicate to the long distance provider switch that the call should be routed to a VRU. A "destination number" is the automatic number identification (ANI) of a line that terminates to a device, such as a telephone, that can accept the call. "Calling card account identification information" is information that identifies a customer's calling card account used for billing calls when the customer is calling away from their home or office. An example of calling card account identification information is a calling card number that identifies a customer's calling card account.

A "local telephone company network" comprises switches and termination equipment within a localized area. A "long distance provider network" comprises a plurality of switches that are located throughout a large geographic area to process long distance telephone calls.

"Long distance calls" are calls that do not originate and terminate within a geographic area within the serving area of one local telephone company that is defined as a local calling region by the local telephone company. "Local calls" originate and terminate within the serving area of one local telephone company or within a geographic area within the serving area of one local telephone company that is defined as a local calling region by the local telephone company.

3.0 Example Environment

FIG. 1 a block diagram of a local payphone calling environment 100. The local payphone calling environment comprises a payphone 102, a telephone company central office switch 104 and a telephone company tandem switch 106 within local telephone company network 122, a long distance provider switch 108, a voice response unit (VRU) 114, and a data access point (DAP) 116 within long distance provider network 120, and a destination phone 118.

Payphone 102 is connected to telephone company central office switch 104 to allow payphone calls initiated by a customer to be routed to local telephone company network 122. Telephone company central office switch 104 is connected to telephone company tandem switch 106 to tandem calls from local telephone company network 122 to long distance provider network 120.

Telephone company tandem switch 106 is connected to long distance provider switch 108 to route the call to the long distance provider network 120. Long distance provider switch 108 is connected to VRU 114 to obtain information from a customer through an interactive menu. DAP 116 is connected to long distance provider switch 108 to respond to queries for information from long distance provider switch 108.

Destination phone 118 is connected to telephone company central office switch 104 to receive the call from long distance provider network 120 via the local telephone company network 106.

Long distance provider switch 108 includes inbound trunk group 110 and outbound trunk group 112. Inbound trunk group 110 receives the call from the telephone company tandem switch 106 and outbound trunk group 112 returns the call to the telephone company tandem switch 106.

Local payphone calling environment 100 will be described further with respect to an exemplary call. A customer initiates the exemplary call using payphone 102. Payphone 102 may be a local telephone company payphone such as those found in local airports and other public places. Payphone 102 is not limited to telephone equipment. Payphone 102 may be any equipment that can be used to initiate a call. For example, payphone 102 may include but is not limited to a telephone, a mobile telephone (also referred to as a wireless telephone), a personal computer or any other equipment that can be used to initiate a call via a telecommunications network. In addition to having call initiation capabilities, payphone 102 has the capability to allow the customer to pay for the call at the time the call is made. For example, payphone 102 may accept money such as coins and/or dollars, a calling card, a credit card, a magnetic swipe card or another intelligent card or device that can be used to pay for a call. Therefore, payphone 102 is any device such as a mobile telephone, a personal computer or any other equipment that can be used to initiate a call and that can accept payment at the time the call is made.

The call initiated by the customer routes from payphone 102 to local telephone company network 122. A local telephone company network 122 comprises switches and termination equipment within a localized area. An example of a local telephone company network 122 is a local telephone operating company network such as Bell Atlantic. Local telephone company network 122 is not limited to processing calls between telephones, but may process any voice or data transmission that can be transmitted on a telecommunications network.

The equipment within local telephone company network 122 that receives the call is telephone company central office switch 104. A switch, also referred to as an exchange, is a component of a telecommunications network that has switching capability and can switch calls to other components within a telecommunications network. For example, a switch in Washington D.C. may receive calls from Maryland and Virginia and switch the calls to customers in Washington D.C. Telephone company central office switch 104 is the first switch accessed during call initiation and last switch to process the call when the call is terminated to destination phone 118. Telephone company central office switch 104 provides switching functionality to telephones, private branch exchanges (PBXs), and to other switches.

Telephone company central office switch 104 resides in a central office. A central office is a building or other facility owned by a local telephone company. A central office is a local telephone company facility where subscribers' lines are joined to switching equipment for connecting other subscribers to each other, locally and long distance. The term central office may be the same as the overseas term "public exchange." A central office may house several switches, such as telephone company central office switch 104 and telephone company tandem switch 106.

Telephone company central office switch 104 is connected to telephone company tandem switch 106. Telephone company tandem switch 106 is also a switch that has switching functionality. Telephone company tandem switch 106 allows a call to be routed via a telecommunications network to other exchanges. Telephone company tandem switch 106 provides access from a local telephone company central office switch 104 to long distance provider network 120. Telephone company tandem switch 106 tandems a call between the telephone company central office switch 104 and the long distance provider switch 108.

Telephone company tandem switch 106 is used to reduce the amount of network needed by the local telephone company. For example, a local telephone company may have a large number of telephone company central office switches 104 within a particular metropolitan area, such as Maryland, Virginia, and Washington D.C. A telephone company tandem switch 106 would interconnect to the telephone-company central office switches 104. The telephone company tandem switch 106 would also interconnect to multiple long distance provider switches 108 in order to provide service to multiple long distance providers. Thus, the telephone company tandem switch 106 reduces the number of connections between multiple telephone company central office switches 104 and multiple long distance provider switches 108.

In one alternate embodiment of the present invention, telephone company central office switch 104 and telephone company tandem switch 106 are the same switch. In a non-Metropolitan area a tandem switch may not be needed to interface with multiple telephone company switches 104 as traffic volumes may not justify multiple telephone company switches 104. The present invention may include any combination of switches within local telephone company network 122 needed to process the call.

Telephone company tandem switch 106 tandems the call to long distance provider network 122. Long distance provider network 122 comprises a plurality of switches that are located throughout a large geographic area to process long distance telephone calls. For example, a national long distance provider network 122 has switches throughout the nation.

The call is received from telephone company tandem switch 106 by long distance provider switch 108. Long distance provider switch 108 is a switch with switching functionality that is in long distance provider network 122. Long distance provider switch 108 processes long distance calls received from telephone company tandem switch 106. Long distance calls are calls that do not originate and terminate within the serving area of one local telephone company. For example, long distance provider switch 108 located in Washington, D.C. may receive calls from telephone company tandem switch 106 and switch the calls to locations outside local telephone company network 122 such as New York, Pennsylvania, and Florida.

In the present invention, long distance provider switch 108 is receiving local calls. Local calls are calls that either originated and terminate within the serving area of one local telephone company or within a geographic area within the serving area of one local telephone company that is defined as a local calling region by the local telephone company. Long distance provider switch 108 is receiving the local call so the long distance provider can determine that the customer wishes to place a local call and properly bill the customer.

In one alternate embodiment of the present invention, rather than using a single long distance provider switch 108, multiple long distance provider switches 108 may be used to process the call. The present invention may include any combination of switches within long distance provider network 120 needed to process the call.

Switches such as telephone company central office switch 104, telephone company tandem switch 106, and long distance provider switch 108 may be implemented using switches manufactured by a number of switch manufacturers such as DMS 250 switches manufactured by Nortel.

In order to determine that the call is a local call rather than a long distance call, long distance provider switch 108 routes the call to voice response unit (VRU) 114. VRU is used to provide interactive voice response services which are enhanced services offered by long distance providers. VRUs allow consumers access to enhanced services such as specialized products and features associated with calling cards. Exemplary features associated with callings cards that require VRU processing include speed dial, reorigination, direct connect, messenger service, conference calling, news flash, and accounting codes.

The features and services above require interface between VRU 114 and the caller. The interface is typically provided via selection using a keypad after hearing a menu of choices. However the interface may be provided by any means telecommunications network equipment can interface with a caller such as by voice recognition or screen sensors reading a customer touching a screen.

In the present invention, VRU 114 allows the customer to select to place a local call and bill it to a calling card account. Using many current VRUs, the customer listens to a recorded menu and enters a number on the keypad of payphone 102 corresponding to a selection of placing a local call provided in the menu. The VRU 114 accepts, processes and notifies long distance provider switch 108 of the customers selection.

VRU 114 may be implemented using a network audio server and an automated call processor. Network audio servers are specialized computers equipped with telephony ports which provide audio responses and collect caller input via dual tone multi frequency (DTMF) signals and voice recognition based on commands provided by the automated call processor. Automated call processors are high performance personal or midrange computers that perform intelligent application processing to determine which services to provide. The automated call processor of VRU 114 may be implemented with personal computers or other midrange computers such as the RISC 6000 manufactured by IBM. The automated call processor communicates with the network audio server via a LAN/WAN and/or routers.

After being notified by VRU 114 that the caller selected to place a local call billed to their calling card, long distance provider switch 108 sends a query to DAP 116 to verify that the customer's calling card is valid. DAP 116 is connected to long distance provider switch 108. DAP 116 is a facility that receives requests for information from switches such long distance provider switch 108, processes the request, and returns the requested information to long distance provider switch 108. In addition to determining whether the calling card is valid, DAP 116 may respond to queries with information needed to process the call through the telecommunications network. For example, long distance provider switch 108 may send a query to DAP 116 to receive information of which trunk group should be used as outbound trunk group 112. Billing centers which process billing for long distance telephone calls are also connected to DAP 116 to retrieve information regarding long distance provider switch 108 or calls processed by long distance provider switch 108 in order to properly bill customers. DAP 116 may be implemented using a personal computer or any other computing system such as a RISC 6000 manufactured by IBM.

Destination phone 118 is any equipment that can receive a call from a telecommunications network. Destination phone 118 may be a telephone, a mobile phone (also referred to as a wireless phone), a personal computer or any other equipment that can receive a call via a telecommunications network.

Within long distance provider switch 108 are inbound trunk group 110 and outbound trunk group 112. Telephone call comes into a switch on a transmission line referred to as the originating port or trunk. The originating port is one of many transmission lines coming into the switch from the same location of origin. The group of ports is the inbound trunk group 110. After processing an incoming call the switch transmits the call to a destination location which may be another switch, a local exchange carrier switch or a private exchange private branch exchange. When a call is transmitted over a transmission line referred to as the terminating port or trunk. Similar to the originating ports terminating port is one of a group of ports going from the switch to the same destination. The group of ports is the outbound trunk group 112.

Alternaively, inbound trunk group 110 and outbound trunk group 112 may be the same trunk group. In this alternate embodiment, the trunk group is bidirectional and receives inbound traffic from the originating port and sends outbound traffic to the terminating port.

4.0 Establishing Local Payphones Through Long Distance Carrier Switches

Figure 2:
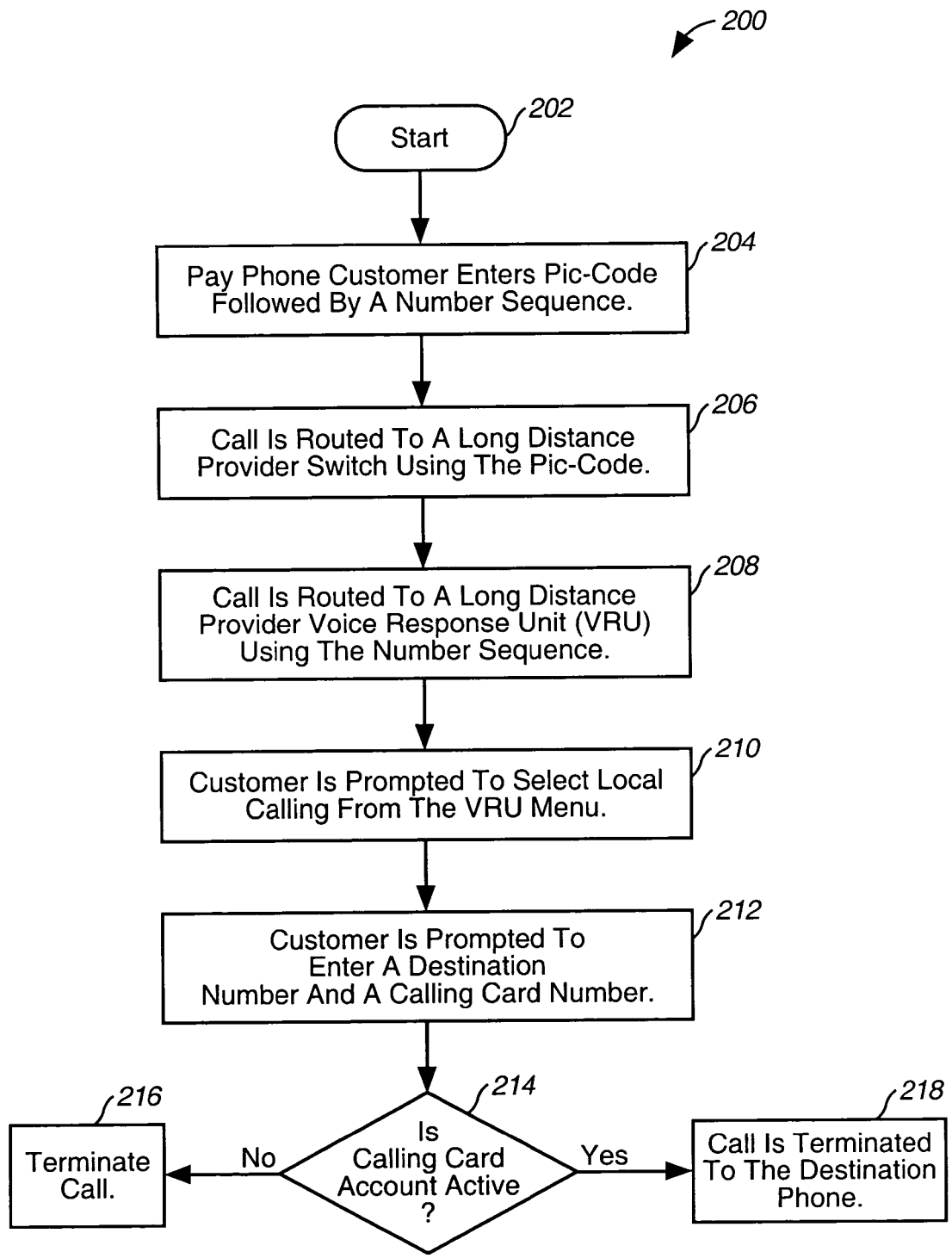
FIG. 2 is a flow diagram representing establishing a local payphone call through a long distance provider switch according to one embodiment of the present invention.

FIG. 2 is a flow diagram representing a method for establishing a local pay phone call through a long distance carrier switch. In step 204 a payphone customer enters a Primary Intralata Carrier (PIC) code followed by a number sequence. A PIC code is used by a local telephone company to identify a particular long distance provider.

PIC codes originated when customers first began choosing long distance providers other than AT&T. Because local telephone companies had to handle multiple long distance providers, local telephone companies needed to be able to identify which long distance carrier was to receive a call. Initially, local telephone companies relied on PIC codes to identify which long distance carrier was to receive a call. Customers were required to dial a PIC code if they wanted to use a long distance carrier other than AT&T. From a home phone, a non-AT&T customer would dial a PIC code and then enter the number they wished to call and their call would be sent to the long distance provider corresponding to the PIC code. Subsequently, local telephone company networks have been enhanced to route the call to a customer's long distance provider using the customer's originating automatic number identification (ANI) which is the telephone number of the telephone that initiated the telephone call.

However, when a customer is initiating a call from a device that is not on a line that is automatically billed to their home account, the customer's originating ANI is not useful in determining the customer's long distance provider. For example, the telephone number of a payphone in an airport does not indicate the long distance provider of customers using the payphone. As a result, other methods have been used for customers to access their long distance providers from payphones. For example, a customer may dial a toll free number and use their calling card. Although the customer is not charged for the toll free call, the owner of the toll free number, in this case the long distance provider, is charged for the call. The customer must pay a surcharge for use of the calling card.

In the present invention, the customer dials a PIC code. The PIC code is not recognized by the local telephone company network 122 as a call. Therefore, neither the customer nor the owner of the PIC code (i.e. the long distance provider) is charged for the call. However, the PIC code identifies the customer's long distance provider and allows the customer access to services provided by their long distance provider, such as local calling, from a phone other than their home phone. In addition, a customer could dial the PIC code from their home phone in order to place a local call and could be charged on their monthly bill for the local call by their long distance service provider rather than by their local telephone company. Similar to early competition for providing long distance services when PIC codes allowed for identification of a customer's long distance service provider, early competition in providing local services is possible because PIC codes again allow for identification of a customer's provider.

In step 206 the call is routed to a long distance provider switch 108 using the PIC code.

In step 208 the call is routed to VRU 114 using the number sequence. When the call is received by the long distance provider switch 108, the long distance provider switch 108 obtains the service that the customer would like to use. Long distance providers offer many services such as dial 1, speed dial, reorigination, direct connect, messenger service, conference calling, news flash, and accounting codes. Therefore, when a call is received by long distance provider switch 108, long distance provider switch 108 obtains information indicating which of the many services offered the customer would like to use. For some services, such as dial 1, the long distance provider switch 108 can determine the service based on information received in the messages used to transmit the call. For other services, the caller enters the selection in response to a message played by a VRU 114. Alternatively, the caller may provide the selection by responding verbally to a VRU 114 or by identifying the selection using another telecommunications device that can accept caller selections, e.g. a screen that accepts touch response by a user.

In the present invention, the long distance provider switch 108 obtains information indicating that the customer would like to place a local call. Following entry of the PIC code, the customer dials a number sequence, 00, which indicates to the long distance provider switch 108 that the call should be processed by VRU 114. The caller then enters the selection in response to messages provided by VRU 114. Alternatively, the customer's wish to access the long distance provider's local calling service could be communicated to the long distance provider switch 108 by receiving a customer's touch selection on the screen of a phone or, if the telephone can only send local calls, the telephone could send a signal that the customer selects local calling.

In step 210 the customer is prompted to select local calling from the menu played by the VRU 114.

In step 212 the customer is prompted to enter a destination number and calling card information. Because the destination number is a local number, the format is NXX-XXXX. NXX is the central office code. The central office code (also referred to as end office code) is part of the national numbering plan which identifies a central office and is associated with a particular telephone company central office switch 104. The central office code is a 3-digit identification under which up to 10,000 station numbers are subgrouped. Exchange area boundaries are associated with the central office code that generally have billing significance. Note that as central office codes are associated with a telephone company central office switch multiple central office codes may be served by a central office (and by a telephone company central office switch). As will be described with more detail with respect to FIG. 4, the central office code will be used by the telephone company tandem switch 106 to route the call to the appropriate telephone company central office switch 104.

In step 214 it is determined whether the customer's calling card account is active. The customer's calling card number is verified by the long distance provider switch 108 sending a query to the DAP 116. The DAP 116 stores active calling card accounts for the long distance provider's customers. The DAP 116 determines whether the calling card number entered by the customer is the same as a calling card number corresponding to an active calling card account. The DAP 116 responds to the long distance provider switch that the calling card account is valid if the DAP 116 has a stored calling card number that matches the entered calling card number and the stored calling card number corresponds to an active account. If the DAP 116 cannot verify the calling card number, the calling card is not valid.

If in step 214 the customer's calling card account is active the call processing flow proceeds to step 216. If in step 214 the customer's calling card account is determined not to be active the call processing flow proceeds to step 216.

In step 216 the call is terminated.

In step 218 the call is routed using the destination number to the destination phone 218.

Figure 3:
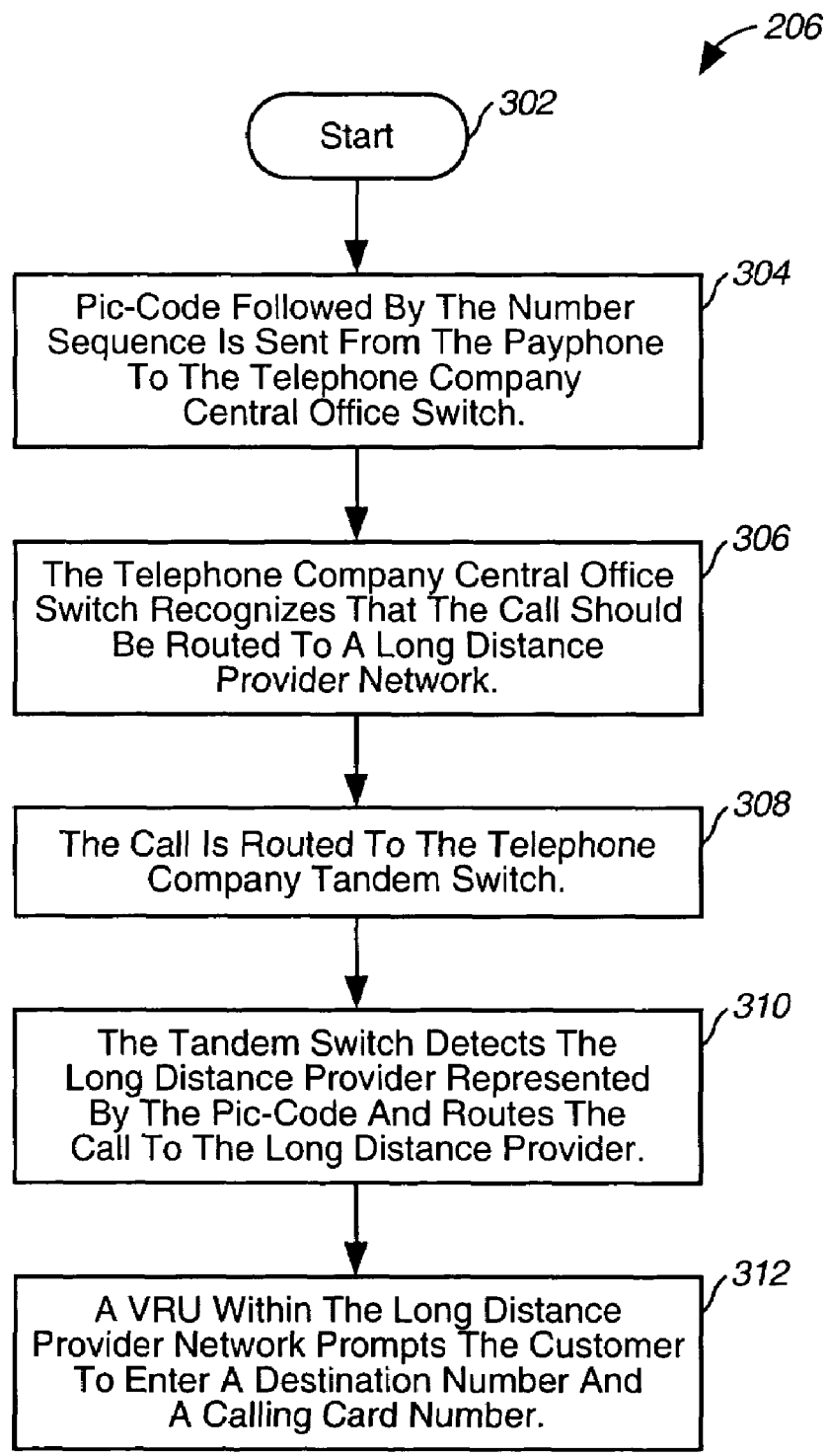
FIG. 3 is a flow diagram representing routing a local payphone call to a long distance provider network according to one embodiment of the present invention.

FIG. 3 is a flow diagram representing routing a local payphone call to a long distance provider network 120 as in step 206 in more detail. In step 304 the PIC code followed by the number sequence is routed to the telephone company central office switch 104. The PIC code and number sequence dialed by the customer using payphone 102 are routed from payphone 102 to the telephone company central office switch 104.

In step 306 the telephone company central office switch 104 recognizes that the call should be routed to a long distance provider network 120. When the customer dials a PIC code followed by a number sequence of 00, the PIC code identifies that the call should be routed to a long distance provider network 120.

In step 308 the call is routed to the telephone company tandem switch 106. Telephone company tandem switch 106 provides interface between multiple telephone company central office switches 104 and multiple long distance provider networks 120. The telephone company tandem switch 106 tandems the call to long distance provider switch 108.

In step 310 the telephone company tandem switch 106 detects the long distance provider network 120 represented by the PIC code and routes the call to the long distance provider network 120. Similar to the telephone company central office switch 104, the telephone company tandem switch 106 identifies that the call should be sent to a long distance provider network 120 using the PIC code. In addition, each PIC code corresponds to a particular long distance provider. Therefore, the telephone company tandem switch 106 can determine which long distance provider network 120 should receive the call. The telephone company tandem switch will have identifier for long distance provider switches 108 that have been chosen by each of the long distance providers to receive calls from the local telephone company. The telephone company tandem switch routes the call to the appropriate long distance provider switch 108 using the PIC code and preestablished agreements with the long distance provider of the long distance provider switch 108 that should receive the call.

In step 312, a VRU 114 within the long distance provider network 120 prompts the customer to enter a destination number and a calling card number. The destination number is the number of the terminating line. The terminating line may be a phone line into the home of a party that will receive the call. The terminating line may be a line connected to a personal computer in an office building that receives the call. The destination number is the number dialed or otherwise entered to connect to a particular called party or called equipment.

The calling card number identifies the customer's home (or business) account that will be billed for the call. The customer will be billed for the call made using the calling card on their monthly bill.

Figure 4:
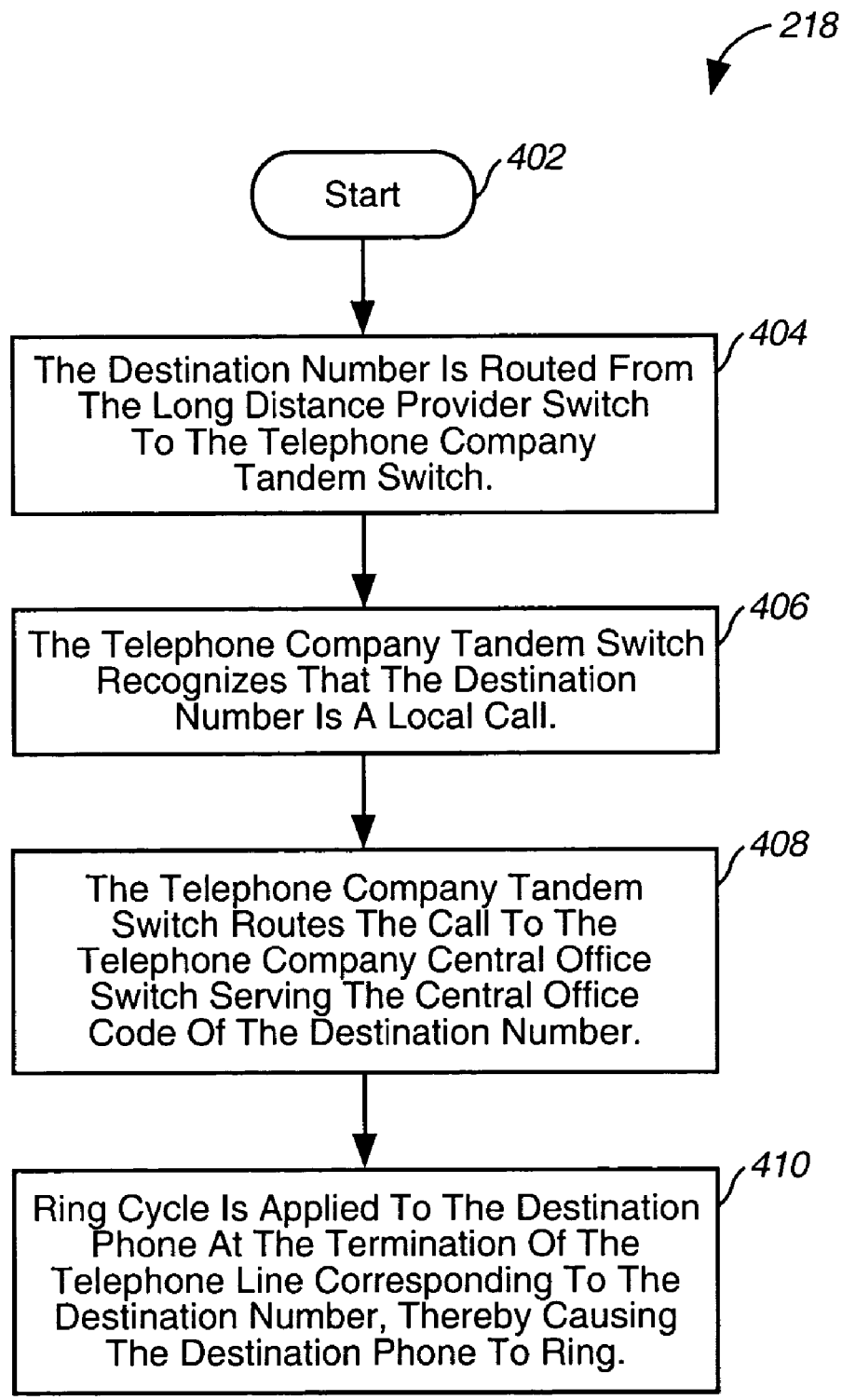
FIG. 4 is a flow diagram representing terminating a local payphone call according to one embodiment of the present invention.

FIG. 4 is a flow diagram representing terminating a local payphone call as in step 218.

In step 404 the destination number is routed from the long distance provider switch 108 to the telephone company tandem switch 106. Because the customer selected local calling in response to prompts played by VRU 114, the call is routed back to the originating telephone company tandem switch 106 for 7 digit dialing only.

In step 406 the telephone company tandem switch 106 recognizes that the destination number is a local call. The destination number is in 7-digit NXX-XXXX format rather than 10-digit long distance format 1+(AAA)-NXX-XXXX, where AAA is the area code. The telephone company tandem switch 106 can identify that the call is in 7-digit format and treat it as a local call.

In step 408 the telephone company tandem switch 106 routes the call to the telephone company central office switch 104 serving the central office code of the destination number. The NXX of the 7-digit local call format for destination numbers identifies a particular central office and a particular telephone company central office switch 104 within the central office. The call is routed to the telephone company central office switch 104.

In step 410 the ring cycle is applied to the destination phone 118 at the termination of the telephone line corresponding to the destination number thereby causing the destination phone to ring. When the destination phone 118 is connected, e.g. a party lifts the receiver answering the call, the billing cycle for the call begins. The payphone customer is charged for the local call in their monthly billing statement from their long distance service provider.

While various embodiments of the present invention have been described above, it should be understood that they have been presented by way of example only, not limitation. Thus, the breadth and scope of the present invention should not be limited by any of the above-described exemplary embodiments, but should be defined only in accordance with the following claims and their equivalents.

What is claimed is:

1. A system for establishing a local call from a payphone comprising:
   means for receiving a user entered primary intralata code followed by a number sequence into a telephone company central switch;
   means for recognizing that the local call is to be routed to a long distance provider based on the user entered primary intralata carrier code and the number sequence, the number sequence indicating that a long distance provider should route the call to an interactive voice response unit; and
   means for routing the local call to a long distance provider switch.

2. The system of claim 1, further comprising means for routing the local call to a telephone company tandem switch for routing to the long distance provider.

3. A system for establishing a local call, comprising:
   a payphone for initiating a call and enabling a user to manually enter a primary intralata code followed by a number sequence;
   a telephone company central office switch for receiving the local call into a local telephone company network;
   a long distance provider switch for accepting said primary intralata code and the number sequence, the number sequence indicating that a long distance provider should route the call to an interactive voice response unit, the interactive voice response unit interfacing with the user and accepting a selection of local calling, a destination number and calling card account identification information; and
   a data access point for verifying said calling card account identification information.

4. The system of claim 3, further comprising a telephone company tandem switch for receiving the local call from said telephone company central office switch and sending the local call to said long distance provider switch.

5. A method to establish a local call from a payphone comprising:
   receiving a user entered primary intralata code followed by a number sequence into a telephone company central office switch;
   recognizing that the local call is to be routed to a long distance provider based on the user entered primary intralata carrier code and the number sequence, the number sequence indicating that a long distance provider should route the call to an interactive voice response unit; and
   routing the call to a long distance provider switch.

6. The method of claim 5, further comprising routing the local call to a telephone company tandem switch for routing to said long distance provider.

7. A method of making a call, comprising:
   initiating the call and enabling a user to manually enter a primary intralata code followed by a number sequence;
   receiving the local call into a local telephone company network;
   accepting said primary intralata code and the number sequence, the number sequence indicating that a long distance provider should route the call to an interactive voice response unit, the interactive voice response unit interfacing with the user and accepting a selection of local calling, a destination number and calling card account identification information; and
   verifying said calling card account identification information.

8. The method of claim 7, further comprising receiving the local call from said telephone company central office switch and sending the local call to said long distance provider switch.

9. A calling method comprising:
   receiving a combination of a user entered primary intralata code and a number;
   recognizing that a local call is to be routed to a long distance provider based on the user entered primary intralata carrier code and the number, the number indicating a long distance provider should route the call to an interactive voice response unit;
   routing the call to a long distance provider switch; and
   at least one of terminating the call or terminating the call to a destination phone at least based on input received at the interactive voice response unit.

10. The method of claim 9, further comprising verifying a calling card.

11. The method of claim 10, further comprising storing active calling card accounts.

* * * * *